US006154946A

United States Patent [19]

Kapp

[11] Patent Number: 6,154,946

[45] Date of Patent: Dec. 5, 2000

[54] METHOD FOR THE MANUFACTURE OF VERY HIGH PRESSURE VESSELS TO SURVIVE HIGH CYCLE FATIGUE LOADING

[75] Inventor: Joseph A. Kapp, Rensselaer, N.Y.

[73] Assignee: Elmhurst Research, Inc., Troy, N.Y.

[21] Appl. No.: 09/002,997

[22] Filed: Jan. 5, 1998

[51] Int. Cl.[7] .................... B23P 11/02

[52] U.S. Cl. .................... 29/447; 29/446; 220/581; 220/586

[58] Field of Search .................... 29/447, 446, 890.051, 29/897, 897.3, 407.08, 407.01; 220/581, 585, 586, 592

[56] References Cited

U.S. PATENT DOCUMENTS

| | | | |
|---|---|---|---|
| 2,375,999 | 5/1945 | Miller . | |
| 2,629,354 | 2/1953 | Gay . | |
| 2,652,943 | 9/1953 | Williams . | |
| 2,904,441 | 9/1959 | Grindrod . | |
| 2,991,900 | 7/1961 | Poorman . | |
| 3,064,344 | 11/1962 | Arne | 29/447 |
| 3,068,562 | 12/1962 | Long | 29/447 |
| 3,191,792 | 6/1965 | Hunt . | |
| 3,280,775 | 10/1966 | Krenzke . | |
| 3,286,103 | 11/1966 | Clapper . | |
| 3,433,382 | 3/1969 | Boggio . | |
| 3,439,405 | 4/1969 | Berman et al. . | |
| 3,762,448 | 10/1973 | Donohue . | |
| 3,769,028 | 10/1973 | Katz et al. . | |
| 3,785,040 | 1/1974 | Pechacek . | |
| 3,824,917 | 7/1974 | Kawahara et al. . | |
| 3,880,195 | 4/1975 | Goodrich et al. . | |
| 3,986,832 | 10/1976 | Smorenburg . | |
| 4,088,444 | 5/1978 | Byrne . | |
| 4,196,225 | 4/1980 | Mencacci . | |
| 4,244,482 | 1/1981 | Baumgart et al. . | |
| 4,325,296 | 4/1982 | Ukai et al. . | |
| 4,446,779 | 5/1984 | Hubbard et al. . | |
| 4,685,305 | 8/1987 | Burg . | |
| 4,751,058 | 6/1988 | Fuchs, Jr. . | |
| 4,809,597 | 3/1989 | Lin . | |
| 4,894,207 | 1/1990 | Archer et al. . | |
| 4,983,411 | 1/1991 | Tanaka et al. . | |
| 5,077,009 | 12/1991 | Subotics et al. . | |
| 5,085,343 | 2/1992 | Scarr . | |
| 5,092,229 | 3/1992 | Chen . | |
| 5,131,583 | 7/1992 | Matsumoto | 228/132 |
| 5,281,426 | 1/1994 | Pardo . | |
| 5,283,033 | 2/1994 | Dodrill . | |
| 5,323,694 | 6/1994 | Higashimoto . | |
| 5,370,043 | 12/1994 | Träff et al. . | |
| 5,410,951 | 5/1995 | Ledet et al. . | |
| 5,476,189 | 12/1995 | Duvall et al. . | |
| 5,518,141 | 5/1996 | Newhouse et al. . | |
| 5,564,332 | 10/1996 | Ludwig . | |
| 5,587,194 | 12/1996 | Nakatani et al. . | |

*Primary Examiner*—David P. Bryant
*Attorney, Agent, or Firm*—Schmeiser, Olsen & Watts

[57] ABSTRACT

The present invention relates to a method for the manufacturing of very high pressure vessels so that they survive high cycle fatigue loading. In particular, the method requires creating a residual tangential stress at a bore radius of a vessel such that the stress under load is more compressive than a maximum applied internal pressure. Furthermore, the method may require creating a residual stress a the inner radii of the supporting jackets such that the stress under load is compressive or zero.

18 Claims, 14 Drawing Sheets

METHOD FOR THE MANUFACTURE OF VERY HIGH PRESSURE VESSELS TO SURVIVE HIGH CYCLE FATIGUE LOADING

BACKGROUND OF THE INVENTION

1. Technical Field

The present invention relates generally to pressure vessels. More particularly, the present invention relates to a method for the manufacture of very high pressure vessels so that they survive high cycle fatigue loading.

2. Related Art

Vessels used to contain high pressures (greater than 10,000 pounds per square inch [psi]) have been used for many years in many industries such as: cannons and small arms, materials processing such as processing polyethylene, and high pressure water jet cutting. Most high pressure commercial applications use vessels that operate at pressures no greater than about 60,000 psi. Some of these vessels, such as those used in polyethylene in polyethylene processing and water jet cutting, are subjected to high cycle fatigue loading. However, some weapons and metals processing operating pressures are as high as, and even greater than, 100,000 psi. This later group of high pressure vessels are not usually subjected to high cycle fatigue loading.

Recently, the use of pressures as high as 100,000 psi have been suggested for sterilizing certain foods. There are many advantages to using high pressure to process food since it can be accomplished at room temperature which allows the processor to control food flavor and quality better than if the food is heated such as in pasteurization. Other unexpected benefits sometimes occur when the high pressure activates some biochemical flavor enhancement reactions. However, to be economically feasible, mass quantities of food must be processed thus requiring pressure vessels that can survive high cycle fatigue loading at very high pressures. Therefore, there is a need to develop high pressure processing equipment that can survive high cycles of very high pressures (above 60,000 psi).

Fatigue failure is a progressive mode of failure that occurs when stresses or strains that will not cause failure in a single application are applied repeatedly. The failure proceeds in three stages. There is, first, a fatigue crack initiation that occurs microscopically, followed by some stable crack propagation or growth until the crack obtains a sufficient size such that the structure ruptures.

To survive a high number of cycles (greater than about 100,000 cycles) means must be taken to: 1) retard or prevent the initiation of fatigue cracks, and/or 2) retard or prevent the propagation of the fatigue cracks produced. However, the stresses produced in high pressure vessels when very high pressures are applied are such that fatigue crack initiation cannot be prevented. Accordingly, the approach of the present invention is to prevent fatigue crack propagation.

Cracks can propagate in fatigue by several mechanisms and under the influence of several loading modes. However, the most damaging and fastest crack growth occurs when the crack is propagated in a direction perpendicular to an applied tensile stress. This is the opening mode of crack loading/propagation. Thus a need exists to provide a method to manufacture a pressure vessel that when followed will result in very long fatigue lives by the prevention of the opening mode of crack loading.

SUMMARY OF THE INVENTION

The basis of the present invention's manufacturing criteria is to build vessels in such a manner that the opening mode of crack propagation is not permitted. In order to achieve this, the process of the present invention includes the steps necessary to construct a monobloc pressure vessel or a multilayered pressure vessel and creating a residual tangential stress in the provided vessel such that at a bore radius of the provided vessel, the tangential stress is more compressive than the maximum applied internal pressure. Since the tangential stress is more compressive than the maximum applied internal pressure, the crack initiation site (the bore radius), when contacted by the fluid pressure, will be prohibited from further opening. In outer layers of the multilayered vessel which do not contact pressurized fluids, crack opening is prevented when the applied tangential stress is zero or compressive at the crack initiation site, i.e., the inside radius of each layer. The vessel created by the present invention can withstand much higher pressures and much higher cycle life than contemporary pressure vessels. As a result, the use of very high pressure vessels with new applications such as food preparation can be achieved while also realizing a higher cycle life for the vessels.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Although certain preferred embodiments of the present invention will be shown and described in detail, it should be understood that various changes and modifications may be made without departing form the scope of the appended claims. The scope of the present invention will in no way be limited to the number of constituting components, the materials thereof, the shapes thereof, the relative arrangement thereof, etc., and are disclosed simply as an example of the preferred embodiment.

Figure 1A:
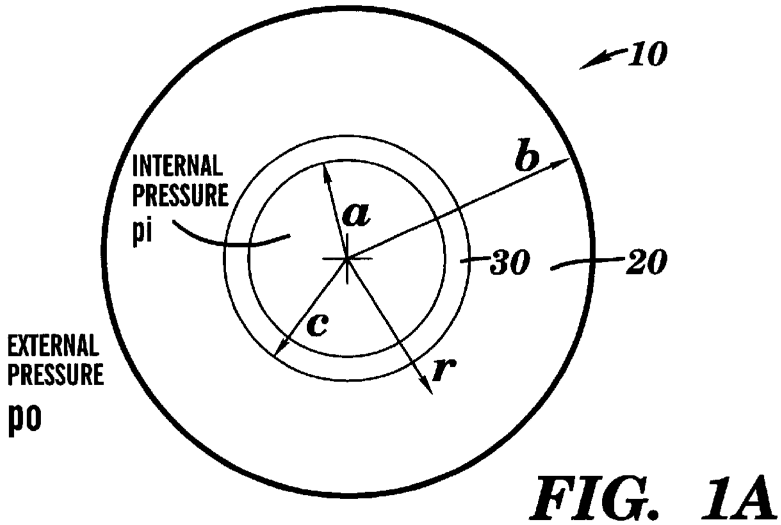
FIG. 1A shows a cross-sectional view of a two layer pressure vessel created by an embodiment of the present invention.
Figure 1B:
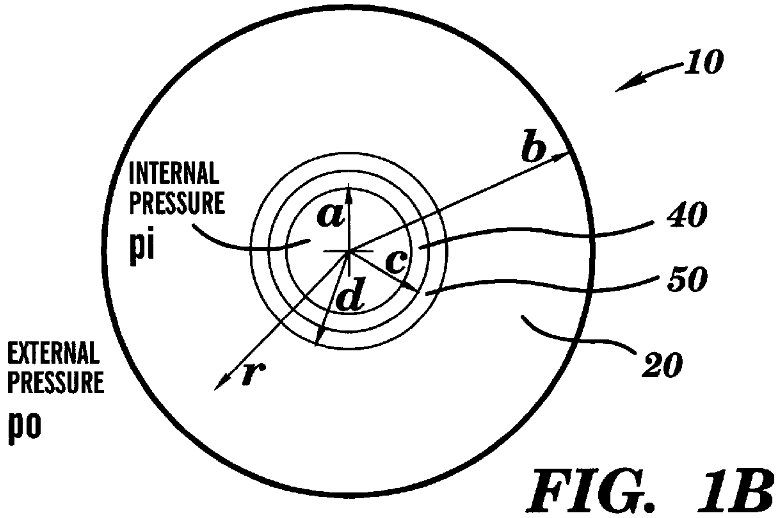
FIG. 1B shows a cross-sectional view of a three layer pressure vessel created by an embodiment of the present invention.
Figure 1C:
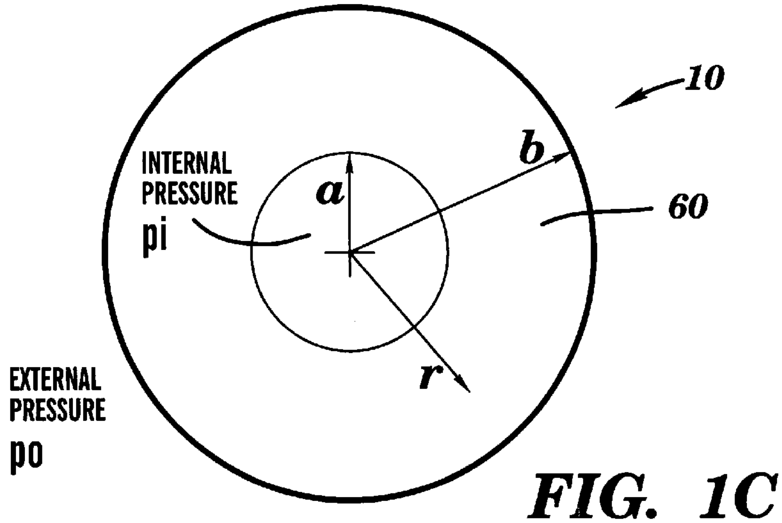
FIG. 1C shows a cross-sectional view of a monobloc pressure vessel created by an embodiment of the present invention.

FIG. 1A shows a cross-sectional view of a thick walled pressure cylinder or vessel 10. The vessel 10 generally includes a monobloc jacket 20 enclosing an internal prestressed protective liner or inner layer 30 in which the pressure applying applications will take place. A prestressed inner layer is defined as an innermost layer in a multilayer vessel which contributes to the overall static structural strength of the complete vessel. A protective liner is defined as an innermost layer in a multilayer vessel which does not contribute to overall static strength of the complete vessel. The purpose of the protective liner is to protect the outer layer of the vessel from contact with the pressurized fluid, e.g., because the fluid is toxic. The layer 30 in FIG. 1A is considered a protective liner 25 if its static strength does not contribute to the overall static strength. Layer 30 in FIG. 1A is a prestressed inner layer if its static strength does contribute to the overall static strength. FIG. 1B shows a vessel that includes both a protective liner 40 and a prestressed inner layer 50. As shown in FIG. 1C, the vessel may also be a monobloc or single piece vessel 60.

The stresses produced in a thick walled vessel (e.g., cylinder) subjected to internal pressure, pi, or external pressure, po, at a given radial coordinate are given by the following equations:

$$\sigma_t = \frac{pi}{Y^2-1}\left(1+\frac{b^2}{r^2}\right)-\frac{poY^2}{Y^2-1}\left(1+\frac{a^2}{r^2}\right) \quad (1)$$

$$\sigma_r = \frac{pi}{Y^2-1}\left(1-\frac{b^2}{r^2}\right)-\frac{poY^2}{Y^2-1}\left(1-\frac{a^2}{r^2}\right) \quad (2)$$

Where a is the inside bore radius of the vessel 10 (also called the pressure boundary since it is the location where the metal of the vessel meets the pressurized fluid), b is the outside radius of the vessel 10, Y is the radius ratio of the outside radius to the inside radius of the particular cylinder layer (e.g., for a whole vessel 10, Y=b/a), r is the radial coordinate at which the stress is measured (a key radial distance being the bore radius a), $\sigma_r$ is the radial stress which acts in the same direction as the radial coordinate, and $\sigma_t$ is the tangential stress which acts perpendicular to the radial stress.

The radial stress is always compressive and varies depending on the radial coordinate r at which measured. The tangential stress is maximum at the inside bore radius a. Further, the tangential stress is tensile from the internal pressure pi and compressive from the external pressure po. To meet the manufacturing criteria, additional loads, i.e., residual loads, must be applied to the vessel or its individual components to overcome the tensile tangential stress produced from the internal pressure pi. In accordance with the present invention, compressive residual stresses are introduced into a vessel to prevent crack propagation at a pressure boundary of the vessel. Residual stresses are those stresses that act in the structure without any externally applied loads present. As a result of the residual stresses, the vessel can accommodate very high pressures and also survive very high cycles of use not possible in contemporary vessels.

The residual stresses may be created by a variety of methods. For instance, residual stresses may be created by shrink fitting a liner or multiple layers inside a jacket. In this case, the liner is manufactured with an outer diameter which is greater than the inner diameter of the jacket and by thermal contraction of the liner and thermal expansion of the jacket, the liner and jacket are allowed to mate at equilibrium temperature. The resulting multilayered vessel exhibits a liner with increased compressive residual stresses on an interior surface.

Alternatively, if a monobloc vessel is chosen, residual stresses can be created by overstraining the monobloc vessel. This can be accomplished by autofrettage which generally includes increasing the internal pressure on the vessel to cause large plastic deformation on the interior of the vessel with no, or much less, plastic deformation on the exterior of the vessel. As a result, upon removal of the pressure, the distribution of stress created in the vessel wall results in high compressive residual stresses on the interior of the vessel. It is important to note with regard to the methods of creating the residual stresses, that the above methods are only illustrative because any method, alone or in combination, that can create the required residual stress may be used.

Further, other parameters play in the amount of required residual stresses for the prevention of crack propagation. For instance, the maximum compressive residual stress that can be introduced into a vessel is the compressive yield strength of the material being used because residual stresses must be elastic and most high pressure vessel materials do not strain harden. As a result, there are four parameters which must be reviewed for long life, all of which will vary depending on the expected application. The four parameters are: radius ratio Y, internal pressure pi, external pressure po and yield strength Sy of the material used.

In the case where the external pressure po is zero, the overall condition for long life in a general thick walled cylinder is met at the bore radius, i.e., r=a, for a given internal pressure pi, yield strength of the material at the pressure boundary Sy and radius ratio Y by the following equation:

$$\sigma_t = \frac{pi}{Y^2-1}(1+Y^2)-Sy=-pi \quad (3)$$

For the case when the external pressure po is zero and the failure location is the jacket 20 or the prestressed inner layer 50, then the limiting condition for long life is met when the following equation is satisfied:

$$\sigma_t = \frac{pi}{Y^2-1}(1+Y1^2)-Sy=0 \quad (4)$$

Figure 2:
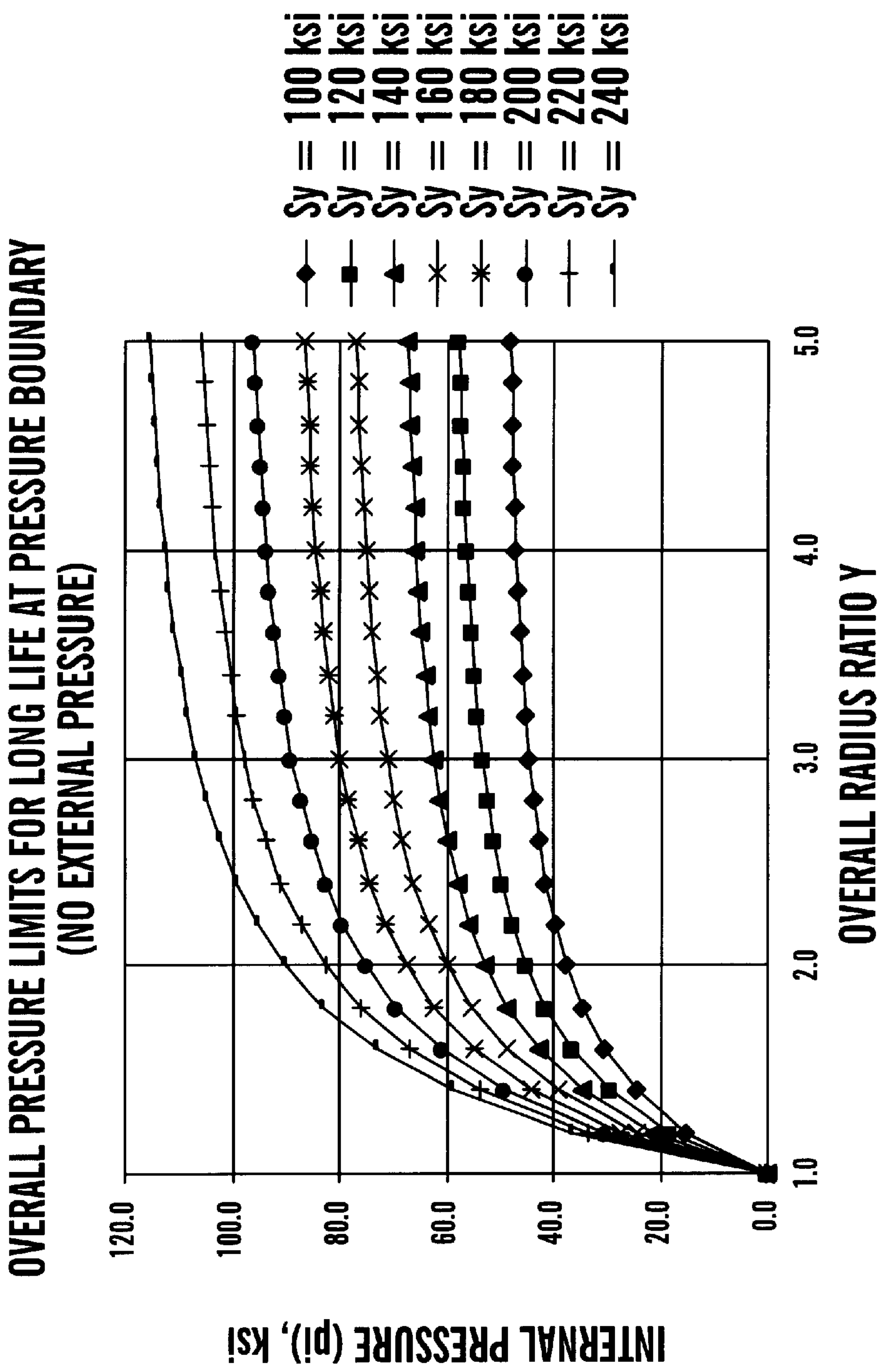
FIG. 2 is a plot of pressure limits for long life at a pressure boundary (no external pressure)

In this equation, Y1 is the radius ratio of the jacket, i.e., the ratio of b to c (Y1=b/c) where c is the inside radius of the jacket 20, if the vessel has two layers as in FIG. 1A. In a vessel with multiple inner layers as in FIG. 1B, Y1 is the ratio of the outside radius of the jacket b to the inside radius 15 of the prestressed inner layer c. The condition for long life in the jacket when multiple inner layers are used is obtained from algebraic manipulation of equations 1 and 2 and will be demonstrated in an illustrated example. The above equations, 3 and 4, are plotted in FIGS. 2 and 3 for the pressure boundary a in a general thick walled cylinder and the jacket 20, respectively. The figures provide the limits on some of the parameters that are necessary to construct a vessel to survive long life.

Beyond the above parameters, there are also other practical factors that must be addressed for actual construction which include, for example, limitations on the means used to produce the residual stresses. For example, shrink fitting by thermal expansion of the jacket is the favored method of construction to produce compressive residual stress in liners. However, in order to produce a residual stress equal to the compressive yield strength in a liner with a very high yield strength, the temperature that the jacket material must attain may, unfortunately, be higher than the tempering temperature of the jacket material or may be high enough to relieve residual stresses present in the jacket. Also, there is a limit to the maximum compressive residual stress that can be applied by autofrettage due to the Bauschinger effect. The Bauschinger effect generally is the characteristic exhibited by a material that has been initially deformed under tensile stress. The effect is that once the tensile deformation is introduced into the material, the material is more easily compressively deformed than it would have been prior to the tensile deformation. As a result, once a vessel has been initially deformed, the amount to which it may be further compressed to create residual stress is limited.

To illustrate the present invention and the interplay of all the above-described parameters, it is best to use specific case examples:

EXAMPLE 1

Desired Internal Operating Pressure Equal to 40 ksi.

This is a case where a monobloc autofrettaged vessel would work. Due to the Bauschinger effect, it has been established that the maximum compressive residual stress is limited to about 70% of the tensile yield strength. By replacing Sy with 0.7Sy in Equation 3, we can generate the series of plots shown in FIG. 4. There are two solutions for this case. Using 120 ksi yield strength material, the required radius ratio is 4.60, or using 140 yield strength material the required radius ratio is 2.33. Although there are other curves plotted in FIG. 4, these are not solutions since it is not recommended practice to use material with strengths higher than about 140 ksi in monobloc construction.

EXAMPLE 2

Desired Internal Operating Pressure Equal to 60 ksi.

Figure 4:
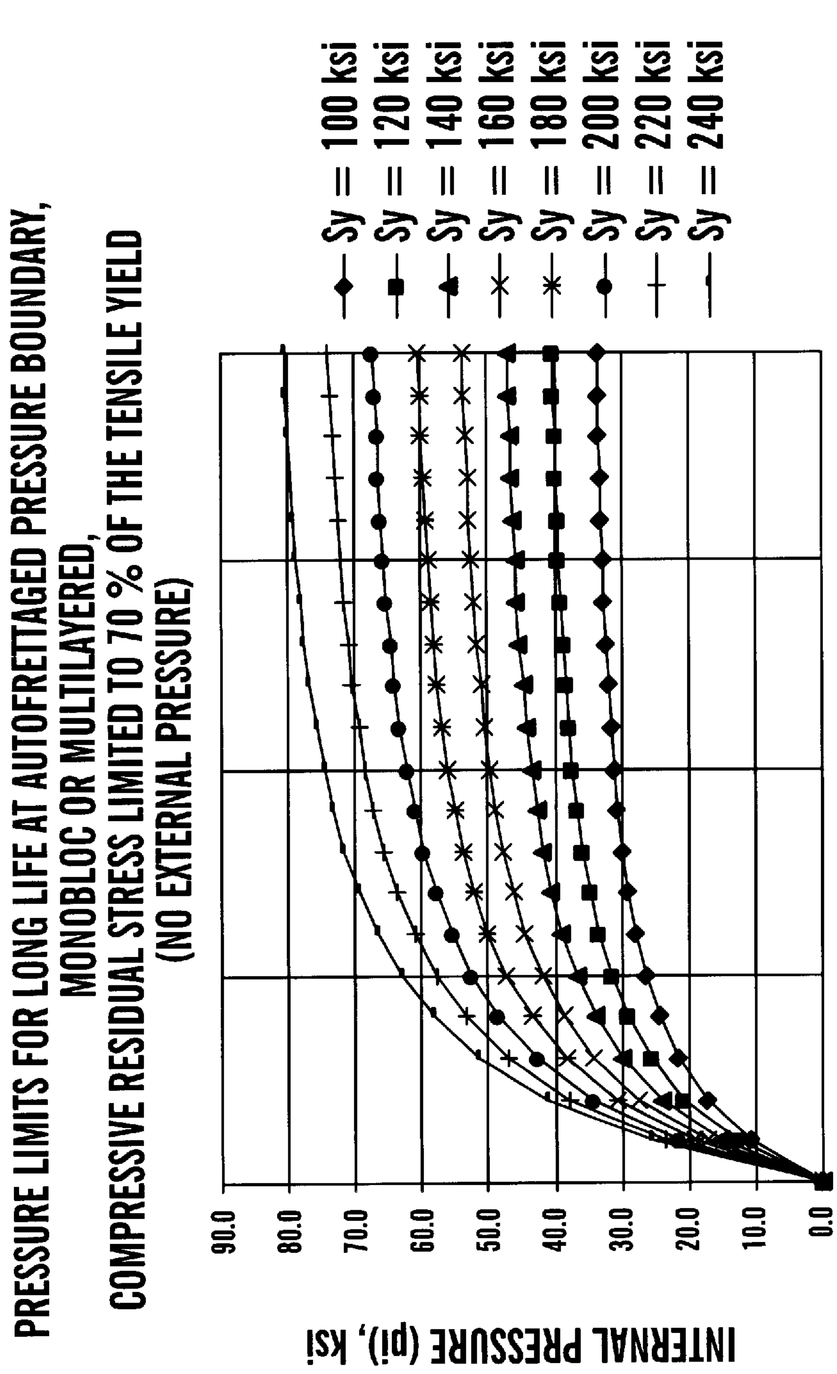
FIG. 4 is a plot of pressure limits for long life in an autofrettaged pressure boundary (no external pressure)

This is a case where the limits of monobloc construction are exceeded because, as shown in FIG. 4, the maximum pressure for autofrettaged vessels with 140 ksi strength material is less than 60 ksi. As a result, we must turn to the use of a multilayered vessel. The solutions for a multilayered vessel can also be obtained from FIG. 2.

The minimum yield strength material applicable is 140 ksi, and the overall radius ratio of the vessel must be at least 2.65. This means that a multilayered vessel with an innermost layer made from 140 ksi yield strength material is shrunk fit into a jacket such that the overall radius ratio of the combined cylinder is at least 2.65.

Figure 3:
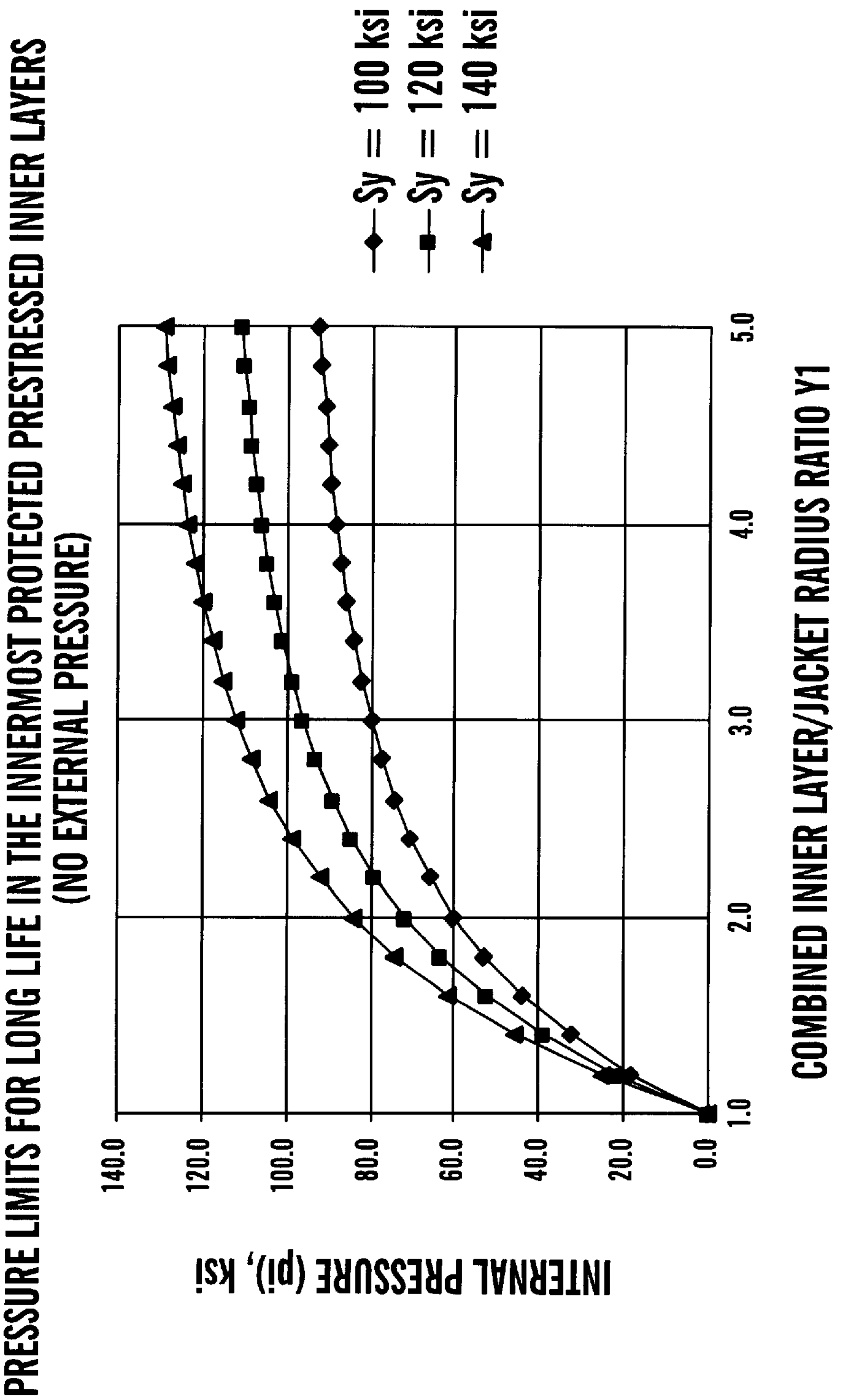
FIG. 3 is a plot of pressure limits for long life in the innermost protected prestressed inner layer of a pressure vessel (no external pressure)
Figure 5:
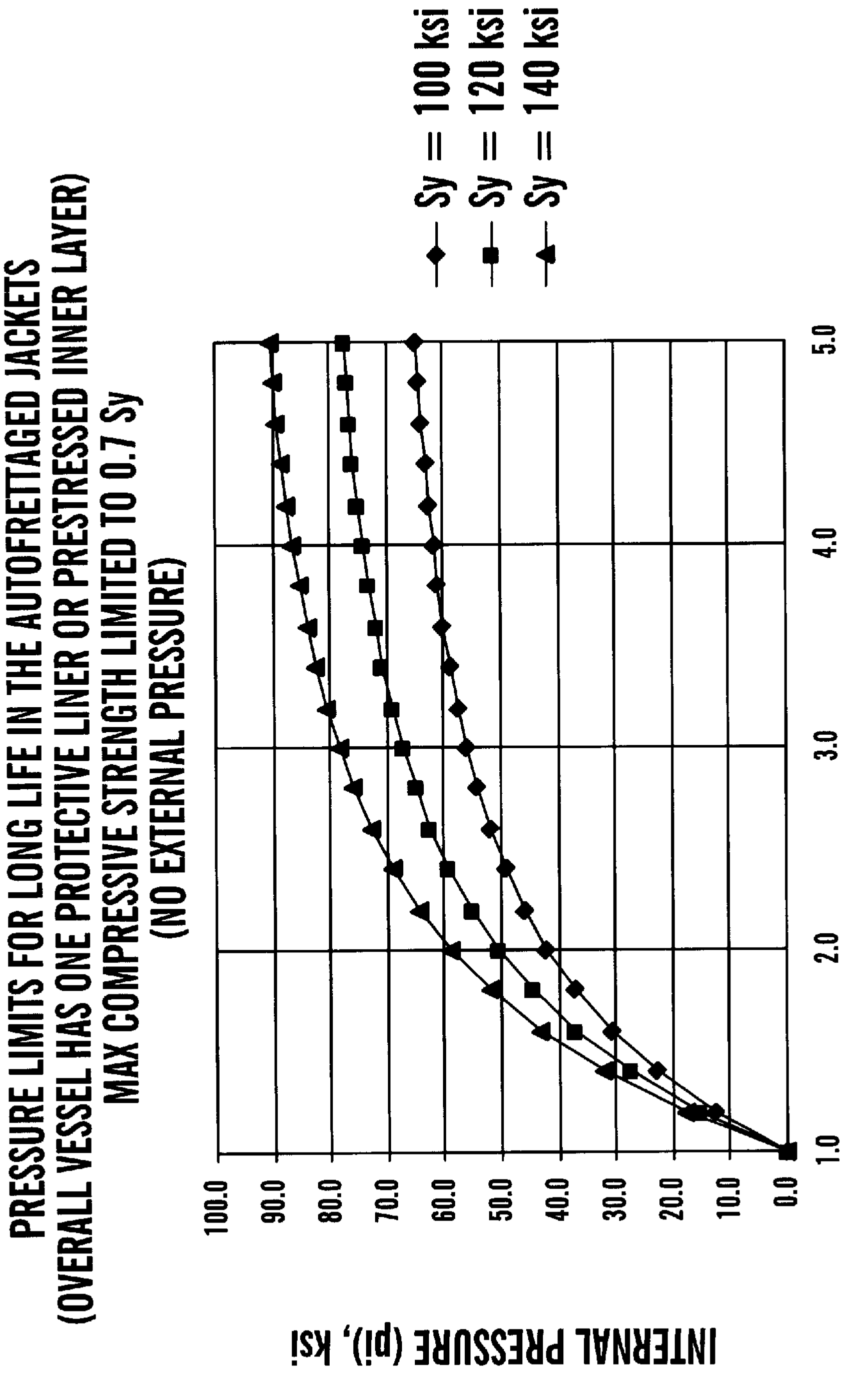
FIG. 5 is a plot of pressure limits for long life in autofrettaged jackets (no external pressure)

If we use autofrettaged jackets, shrunk fit around the 140 ksi liner, then we must generate another set of manufacture curves similar to FIG. 3, but correcting for the Bauschinger effect. These solutions are shown in FIG. 5. There are three solutions so that the jacket withstands the 60 ksi internal pressure: using 100 ksi material, the radius ratio in the jacket must be at least 3.60; with 120 ksi material, the radius ratio must be at least 2.45; and with 140 ksi material, the radius ratio must be at least 2.04. Choosing the 120 ksi jacket with a required radius ration of 2.45, and knowing the overall radius ratio of the vessel must be at least 2.65, with a liner made from 140 ksi material the liner's radius ratio must be at least 1.08.

When shrink fit construction is used, however, there are practical limitations to the use of thermal expansion as the assembly method. The equations that are applicable include Equations 1 and 2 for the radial and tangential stresses at a given radial coordinate r and the following equations for shrink fits and thermal expansions.

To illustrate, using the above example when assembled, the liner bore will have a tangential stress equal to −140 ksi to meet the requirements of the manufacturing criteria. The interface pressure, the pressure existing between the liner and jacket, that will produce this residual tangential stress is calculated from Equation 1 with some modifications. In particular, pi is set equal to 0, Y is replaced with the liner's radius ratio of 1.08 and r is set equal to a, the bore radius. The interface pressure is determine by the external pressure po. For the above example, po is 9.98 ksi. This pressure can be produced by an interference fit between the liner and the jacket. The required interference strain between the liner and jacket, $\epsilon$ (the ratio of the interference to the radius c) is given by the equation:

$$\varepsilon = \frac{po}{E}\left[\frac{2YI^2(Y^2-1)}{(Y^2-YI^2(YI^2-1)}\right] \tag{5}$$

Where po is the interface pressure, Y1 is the liner radius ratio (Y1=c/a), Y is the overall radius ratio (Y=b/a), and E is the elastic modulus of the material used. With Y1=1.08 and Y=2.65 and using steel with an elastic modulus of 30,000 ksi, the interference strain is 0.004796.

Using thermal expansion to overcome the interference strain so that assembly is possible, there must be a temperature difference ΔT, between the jacket and the liner which is a function of the thermal coefficient of expansion α, of the materials used. Since we are using steels, the nominal value of α is 0.000006 in./in./° F. To determine the temperature difference required to overcome the interference strain, the following equation is applicable:

$$\Delta T = \epsilon/\alpha \tag{6}$$

When appropriate values are input into the equation, the minimum temperature difference is 800° F. However, from a practical viewpoint, additional expansion is required because the value given by Equation 6 would give zero clearance, so a more meaningful value of temperature difference would be more like 900° F. minimum, i.e., a 100° F. tolerance.

Unfortunately, because the jacket is autofrettaged, the maximum temperature that the jacket should be subjected to is 700° F. because subjecting it to temperatures above about 700° F. could relieve some of the desired residual stresses created by the autofrettage process. To achieve the ΔT of 900° F., according to the present invention, the liner is cooled to at least minus −200° F. This is easily achieved by cooling the liner in a liquid nitrogen bath. Nitrogen is a liquid between about −350° F. and −320° F. As a result, the thermal expansion/contraction method of construction is a possible means of creating the vessel in accordance with the present invention's modifications.

EXAMPLE 3

Desired Internal Operating Pressure is 70 ksi

In this range, we could use the same approach that was followed in Example 2. Using FIG. 2 to determine the vessel overall radius ratio Y and FIG. 5 for the jacket radius Y1 and using a liner made from 180 ksi material, we would need a vessel with an overall radius ratio of at least 2.12. Using an autofrettaged jacket of 140 ksi material, the jacket minimum radius ratio would be 2.45. The required overall minimum radius ratio of 2.12 is exceeded if the liner has a radius ratio of 1.1 (arbitrarily selected) and the jacket has a radius ratio of 2.45. The overall radius ratio would then be 2.695.

To meet the long life condition, the radial stress at the interface between the liner and the jacket must equal the operating pressure of 70 ksi when the internal pressure is applied. This condition is determined by manipulating Equation 1. The condition for long life at a pressure boundary is that $\sigma_t$ must be at least as compressive as the internal pressure. By replacing $\sigma_t$ with −pi, and with r=a in Equation 1, for any radius ratio Y, we find that po must equal pi. When the internal pressure pi is applied, the interface pressure has two components: the radial stress produced by the internal pressure from Equation 2, and the interference pressure from shrink fitting. From the geometry conditions quoted and Equation 2, the radial stress when 70 ksi internal pressure only is applied is 55.9 ksi at the interface between the liner and jacket. Accordingly, for the overall interface pressure at load to equal the 70 ksi operating pressure, the shrink fit pressure must be equal to 14.1 ksi which when added to the 55.9 ksi produces the required 70 ksi. From Equation 5, this will require an interference strain of 0.005604. From Equation 6, the temperature differential required to create this thermal expansion to overcome this strain is 934° F. Once again, assuming the need for at least 700° F., we would have to cool the liner to at least −335° F., which is the limit for this procedure.

Another solution for the 70 ksi operating pressure case is to use a slip fit liner and jacket arrangement and autofrettage them in place together. The conditions needed would be taken from FIGS. 4 and 5. Using 240 ksi yield strength material for the liner, the minimum overall radius ratio required is 2.45. From FIG. 5, the minimum radius ratio of an autofrettaged jacket is also 2.45. Therefore, the overall geometry described in the last paragraph would also fit for this example. Once the liner and the jacket were assembled, they would be autofrettaged to produce the maximum residual stress possible.

EXAMPLE 4

Desired Internal Operating Pressure is 80 ksi

In this range, we could attempt to use the same approach that was followed above. However, calculating the requirements using Equations 2, 5 and 6 would lead to a finding that we would need a total temperature difference of 1090° F., and would have to cool the jacket to at least −390° F. This requires more exotic cryogenic processes than are contemporarily used. As a result, another way must be utilized to meet the needs of the vessel.

An alternative to achieve additional compressive tangential stress is with the application of external pressure to the whole vessel. The conditions for long life with external pressure are determinable using modified equations from those above. The derivations are created as follows: with Equation 1, at the pressure boundary, we subtract the yield strength and set the result equal to the negative of the internal pressure. See Equation 7. Alternatively, as with Equation 8, if the layer is protected (the jacket in FIG. 1A, or the prestressed inner layer in FIG. 1B), we set the result equal to zero. Accordingly, the results are as follows for non-autofrettaged vessels:

$$\sigma_t = \frac{pi}{Y^2-1}(1+Y^2) - Sy - \frac{2poY^2}{Y^2-1} = -pi \tag{7}$$

$$\sigma_t = \frac{pi}{Yl^2-1}(1+Yl^2) - Sy - \frac{2poYl^2}{Y^2-1} = 0 \tag{8}$$

Figure 6:
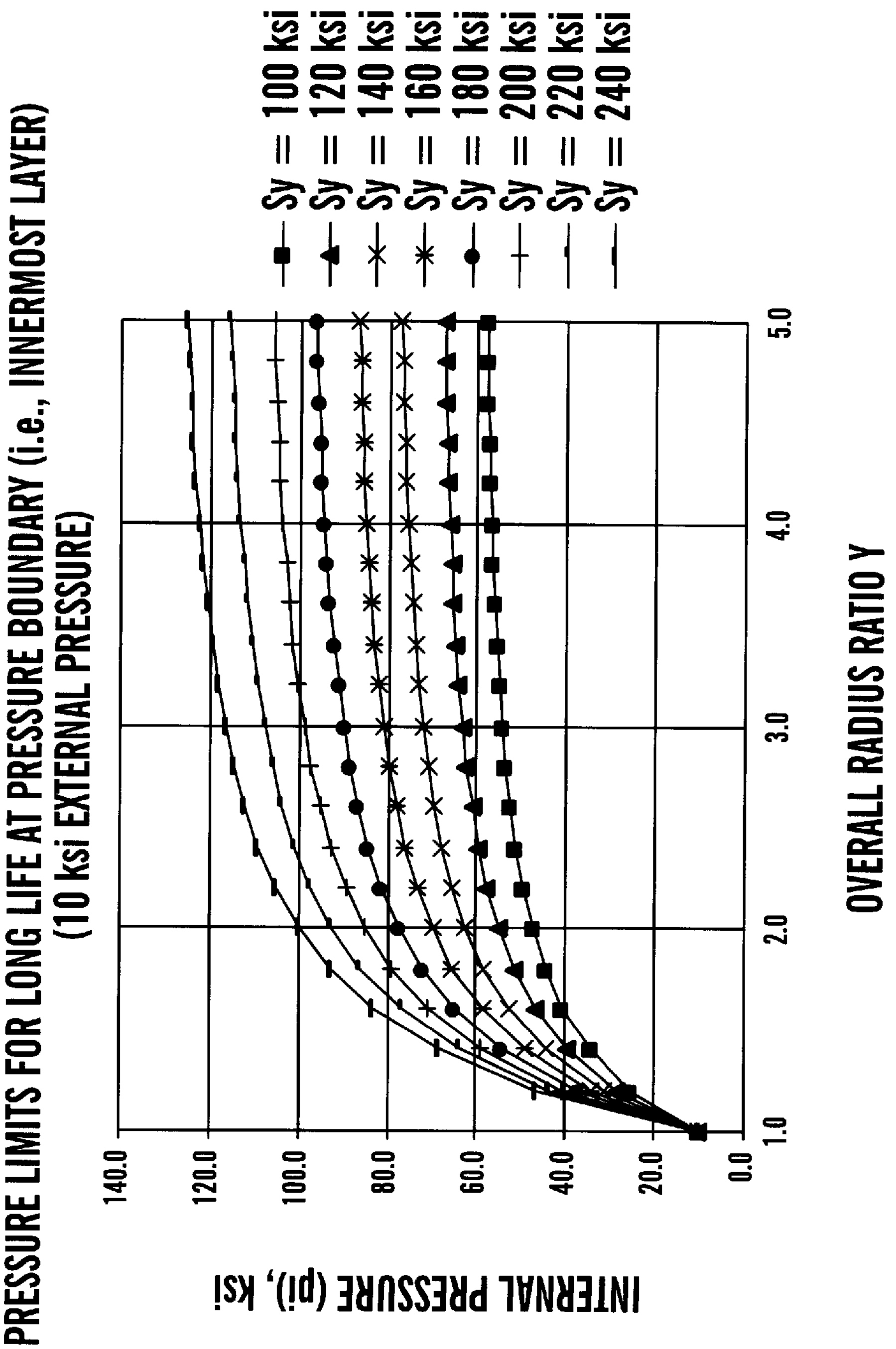
FIG. 6 is a plot of pressure limits for long life at a pressure boundary (10 ksi external pressure)
Figure 7:
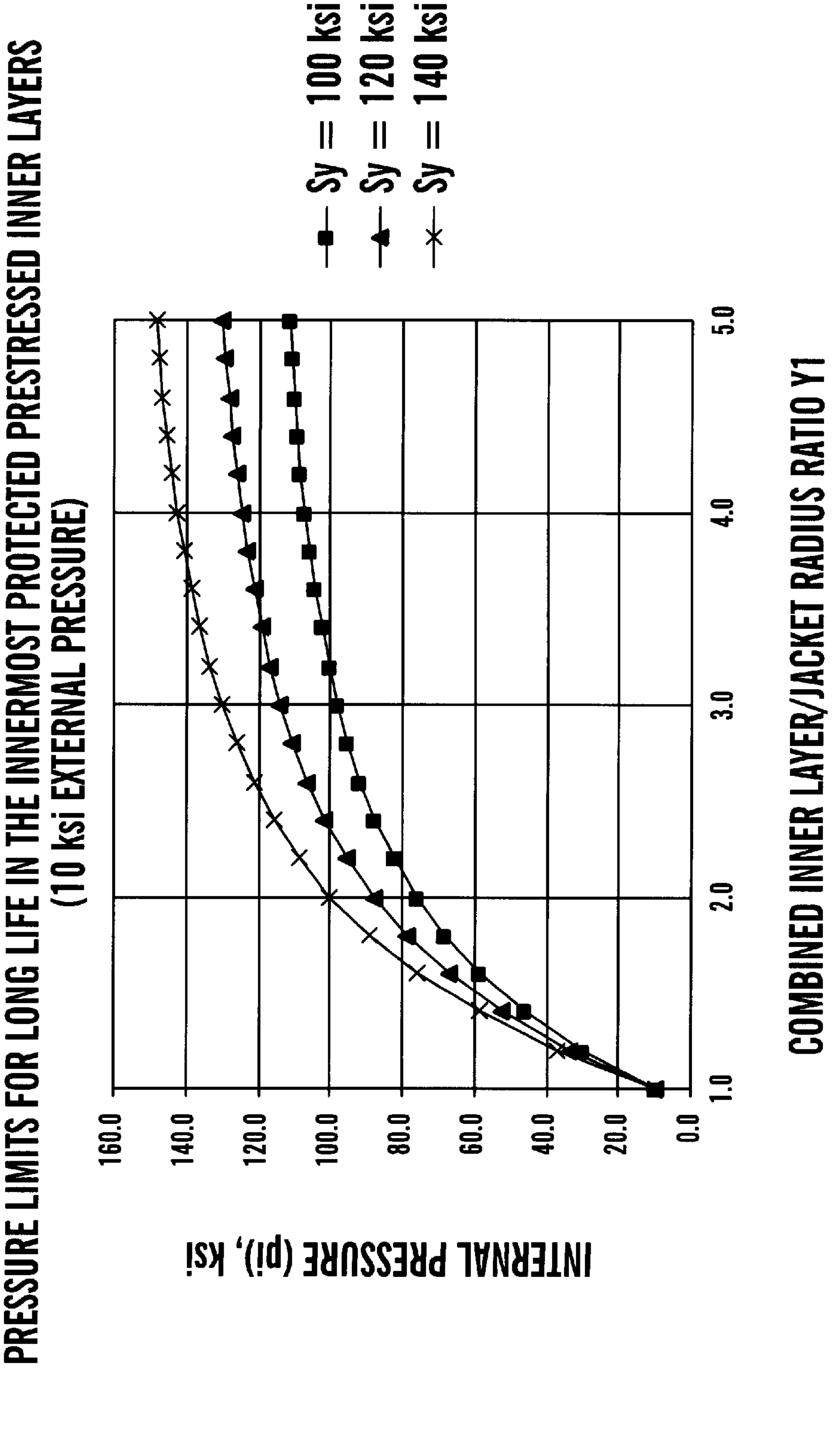
FIG. 7 is a plot of pressure limits for long life in protected prestressed inner layers of a jacket of a pressure vessel (10 ksi external pressure)
Figure 8:
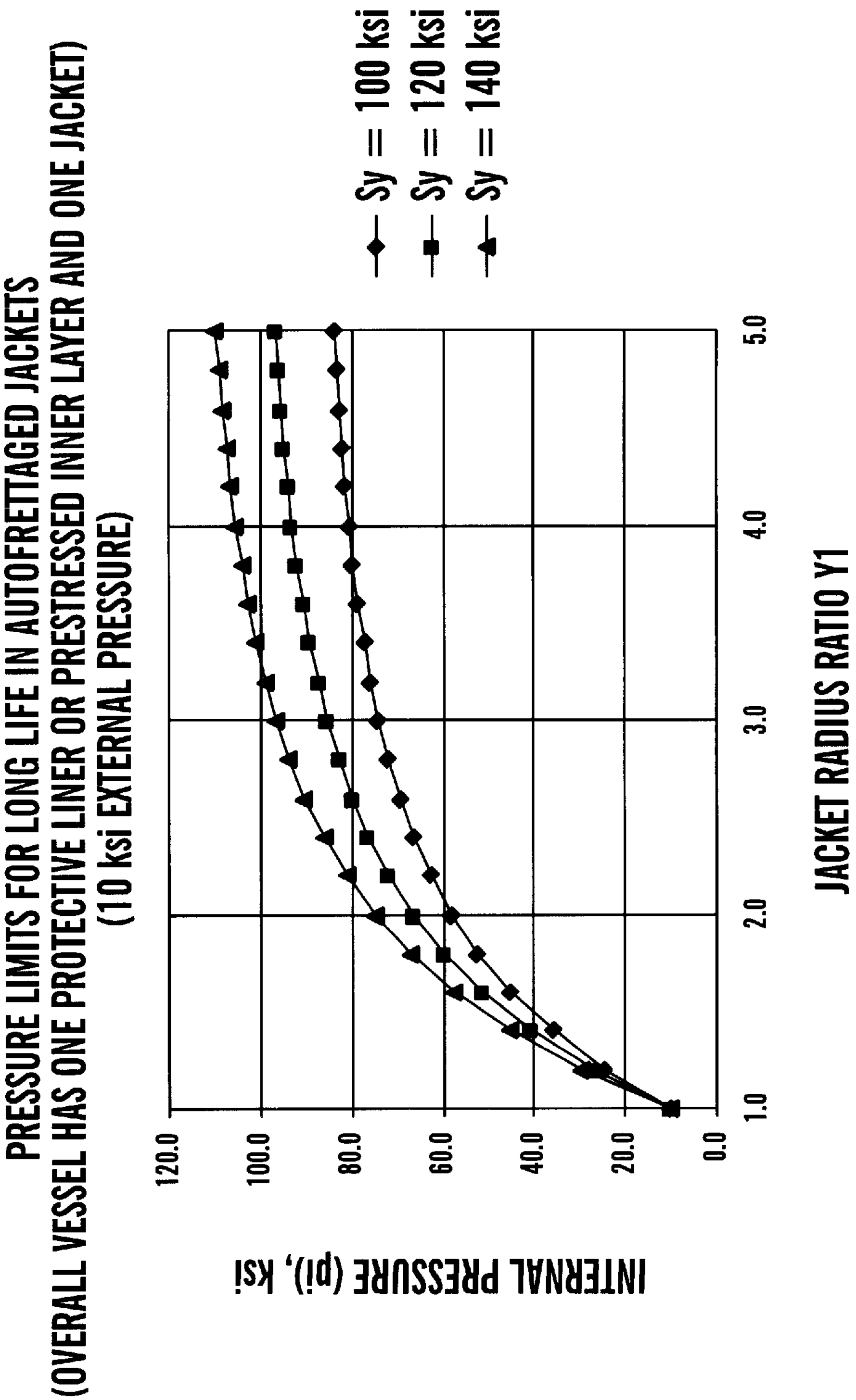
FIG. 8 is a plot of pressure limits for long life in autofrettage jackets (10 ksi external pressure)
Figure 9:
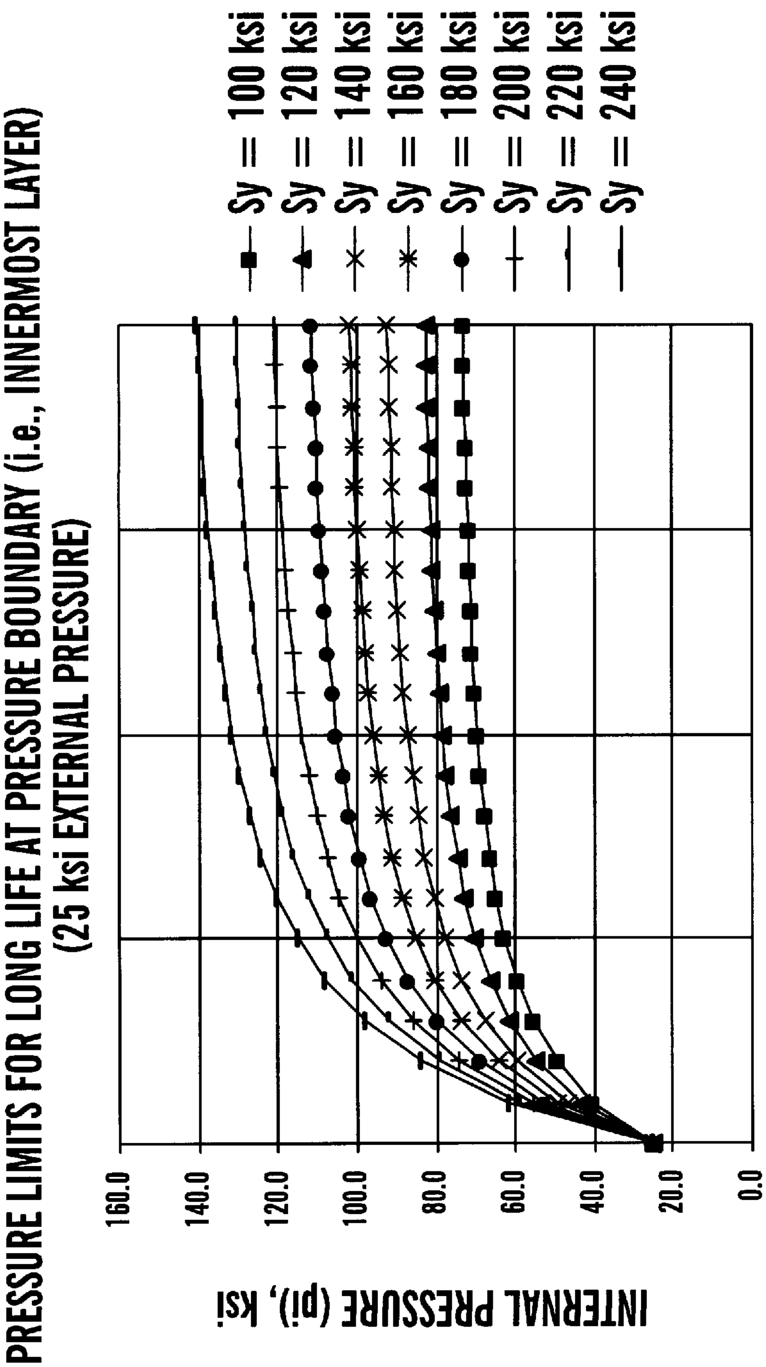
FIG. 9 is a plot of pressure limits for long life at a pressure boundary (25 ksi external pressure)
Figure 10:
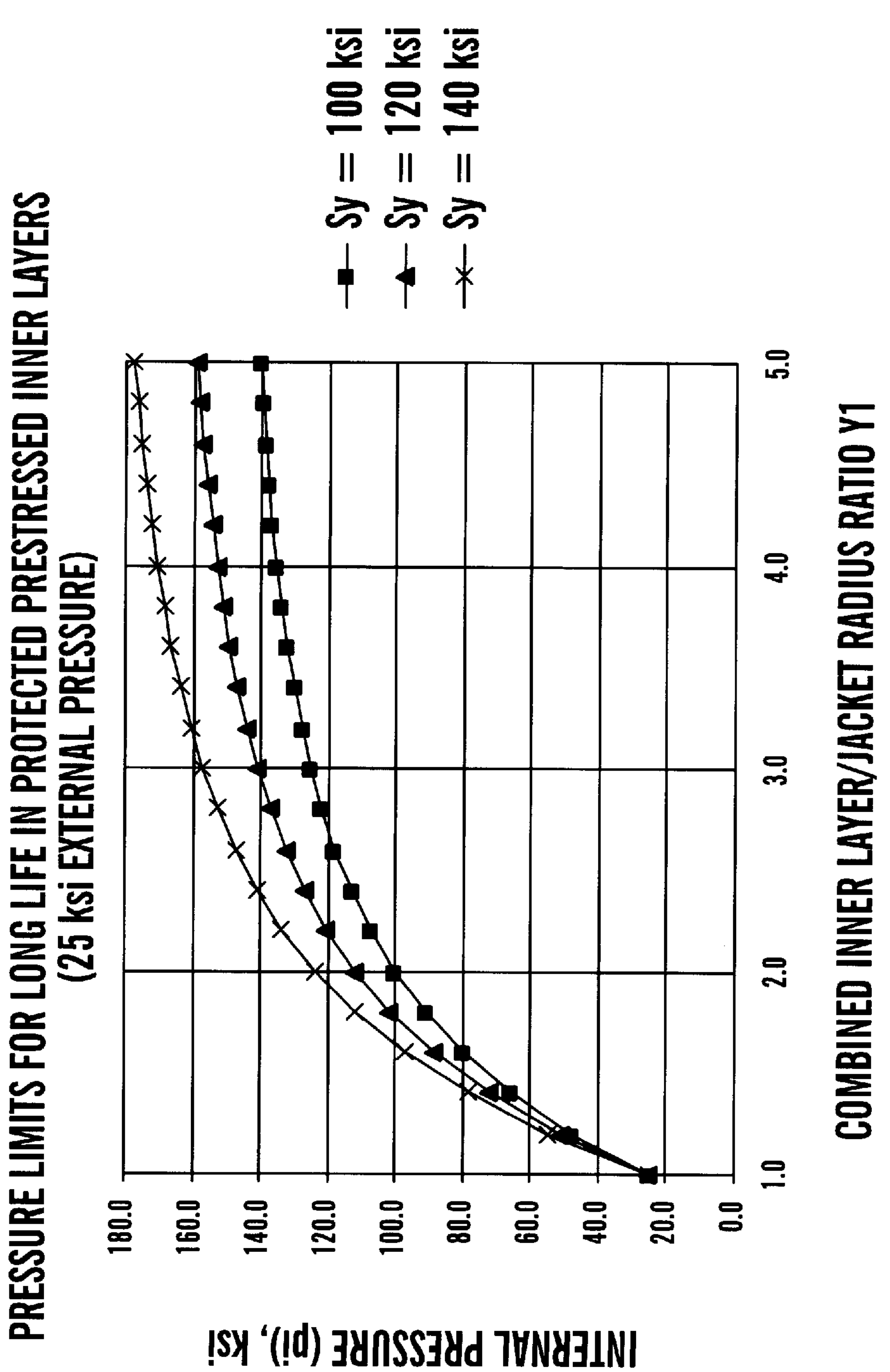
FIG. 10 is a plot of pressure limits for long life in protected prestressed inner layers of a jacket of a pressure vessel (25 ksi external pressure)
Figure 11:
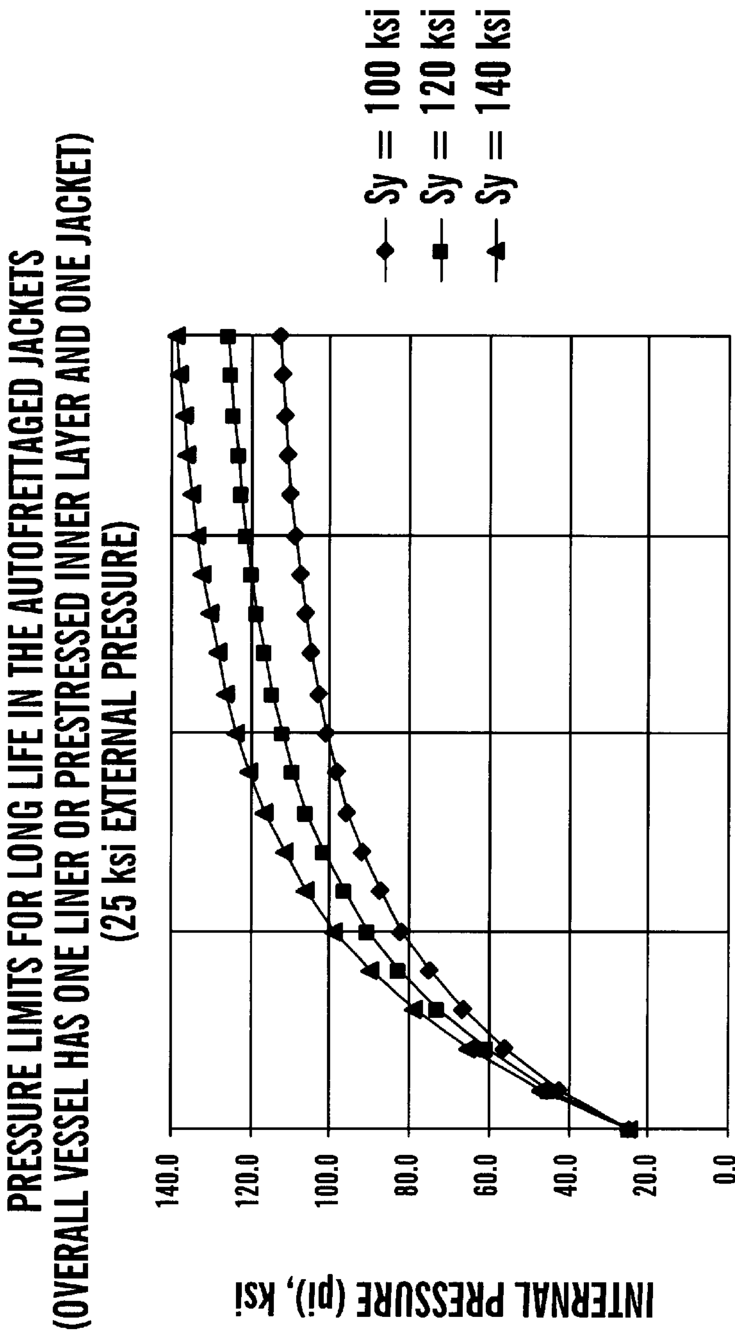
FIG. 11 is a plot of pressure limits for long life in autofrettaged jackets (25 ksi external pressure)
Figure 12:
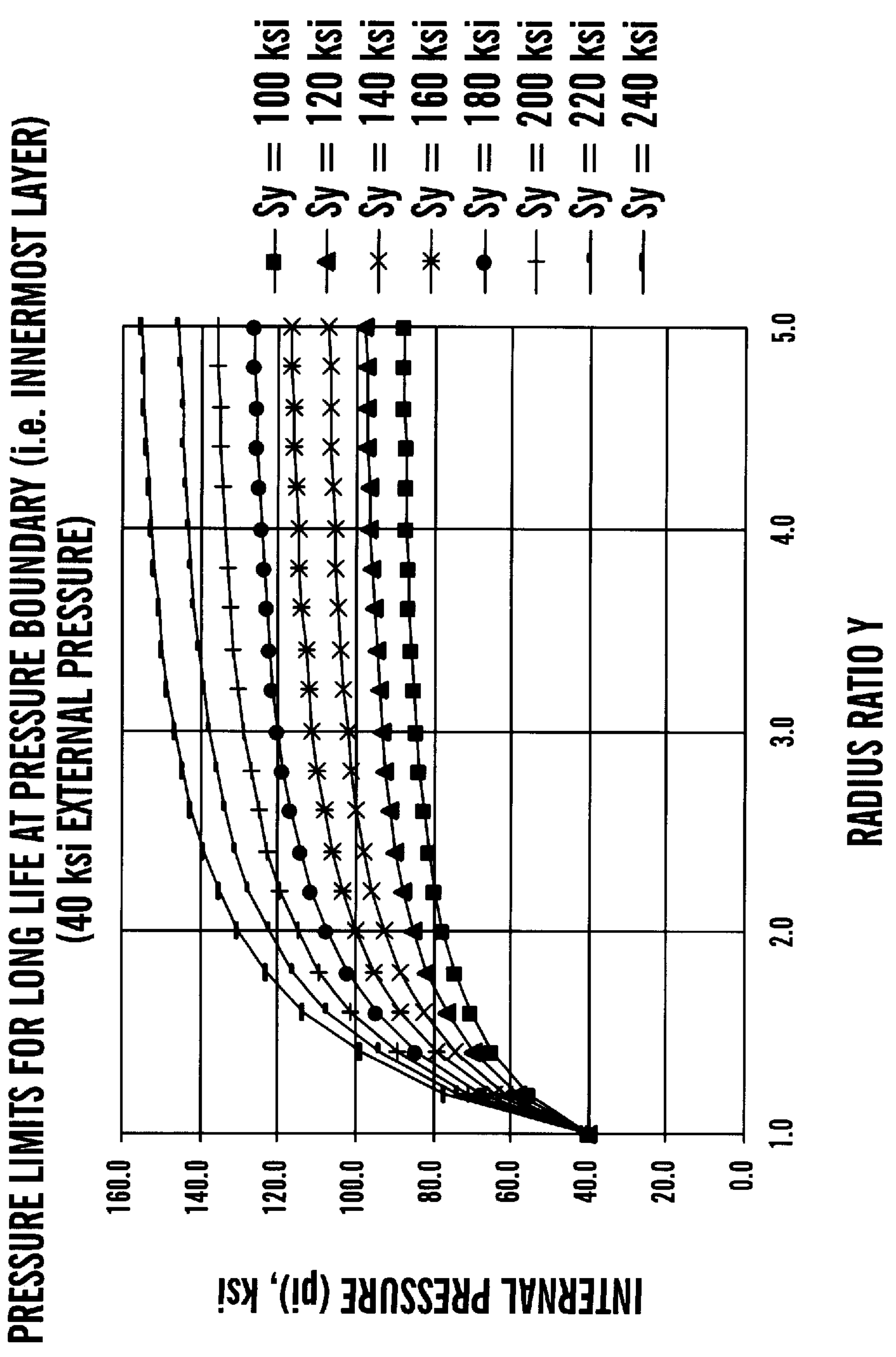
FIG. 12 is a plot of pressure limits for long life at a pressure boundary (i.e., inner layer) (40 ksi external pressure)
Figure 13:
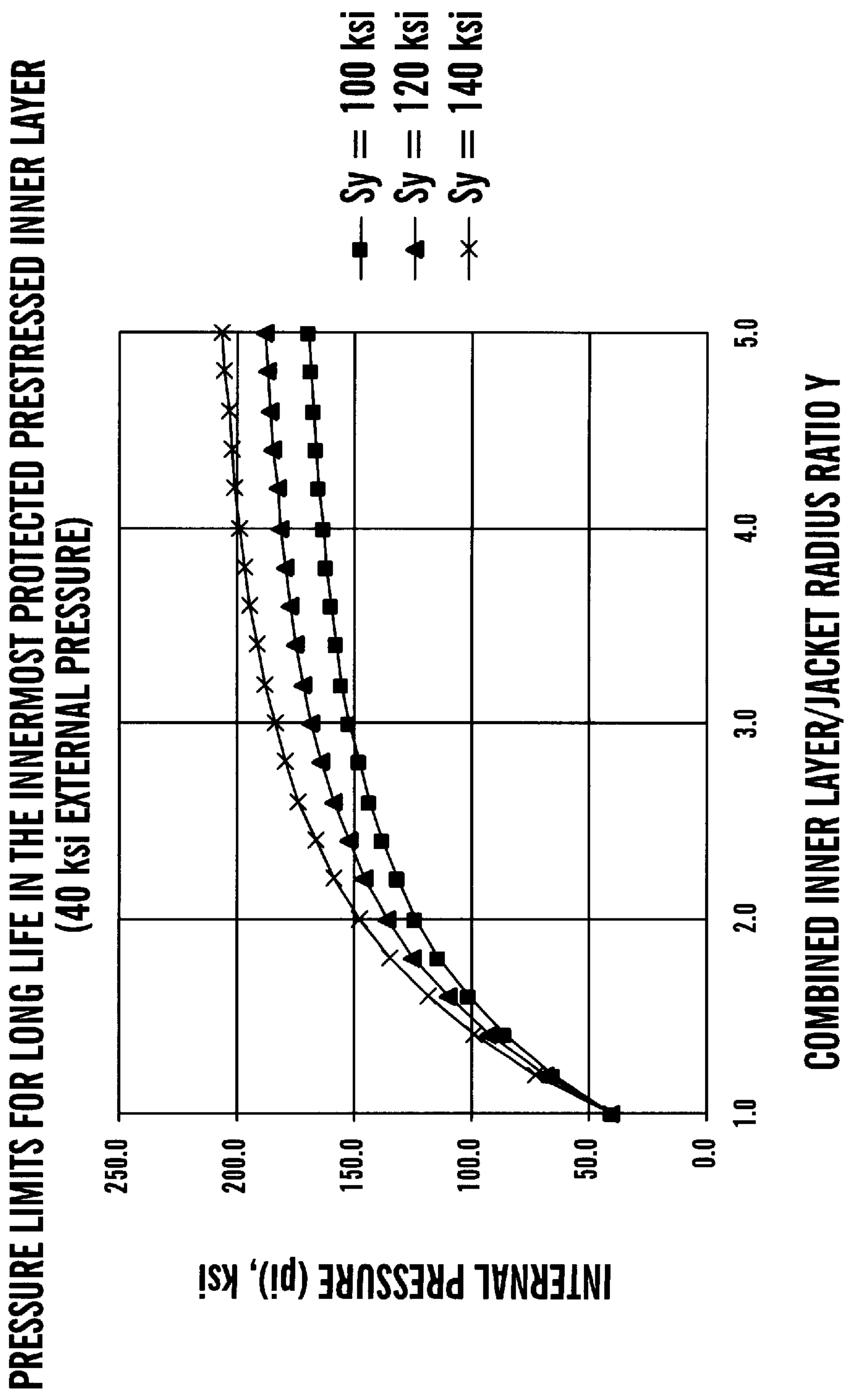
FIG. 13 is a plot of pressure limits for long life in the innermost protected prestressed inner layer in a jacket of a pressure vessel (40 ksi external pressure)
Figure 14:
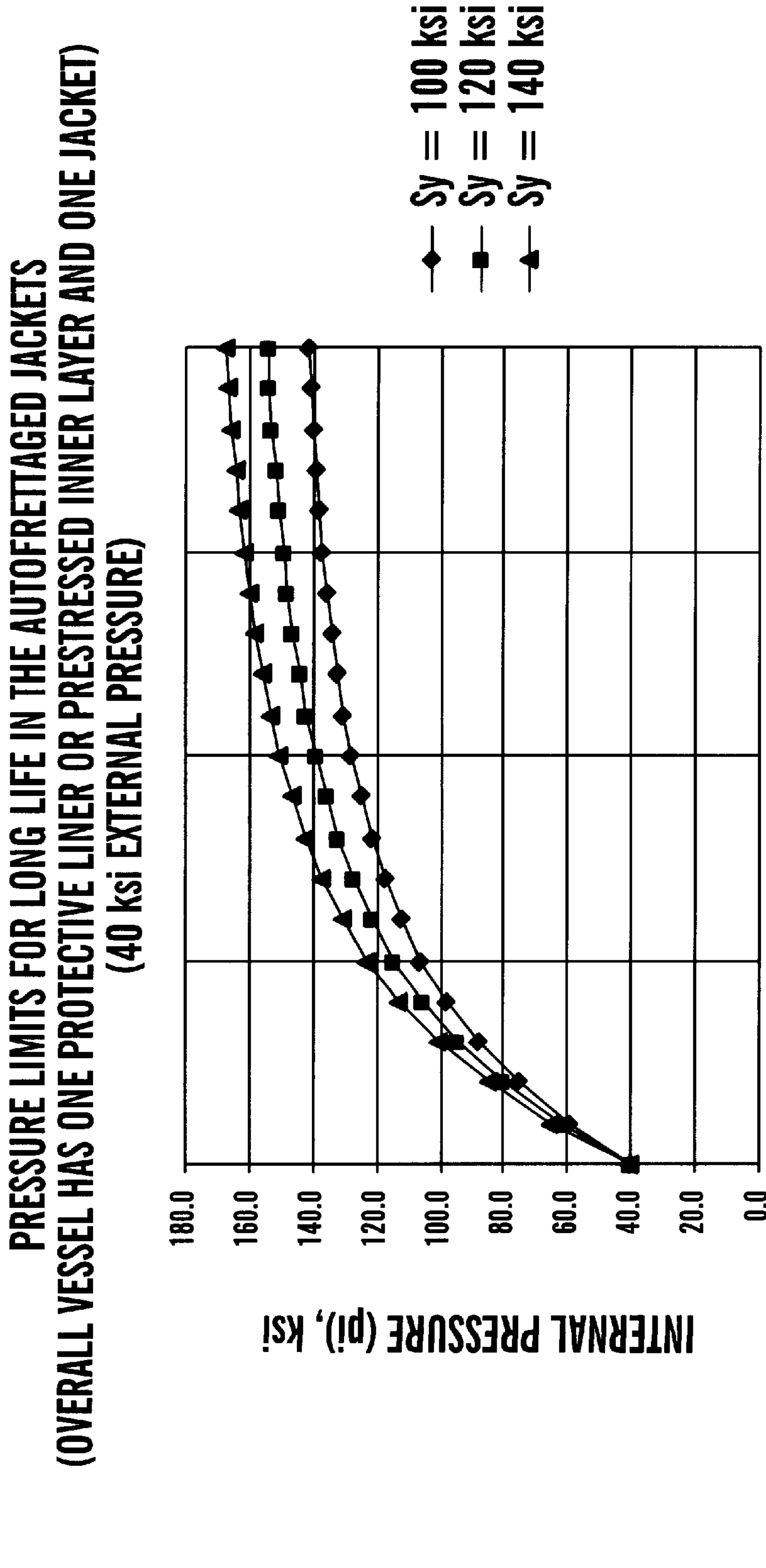
FIG. 14 is a plot of pressure limits for long life in autofrettaged jackets (40 ksi external pressure).

For autofrettaged jackets, the value Sy in Equation 8 is replaced by 0.7Sy. Based on these results we have generated a series of plots for the conditions: internal pressure pi, radius ratio Y of the vessel, radius ratio Y1 of the inner layer and jacket if multiple inner layers are used, radius ratio of the jacket Y1 if a single inner layer or liner is used, and yield strength Sy of the material. FIGS. 6–8 show the plots for the overall vessel (FIG. 6), protected prestressed inner layers (FIG. 7) and autofrettaged jackets (FIG. 8) at an external pressure of 10 ksi. FIGS. 9–11 show the plots for the overall vessel (FIG. 9), protected prestressed inner layer (FIG. 10) and autofrettaged jackets (FIG. 11) at an external pressure of 25 ksi. FIGS. 12–14 show the plots for the overall vessel (FIG. 12), protected prestressed inner layers (FIG. 13) and an autofrettaged jacket (FIG. 14) at an external pressure of 40 ksi.

Considering an internal operating pressure of 80 ksi and assuming that we use construction that utilizes an external pressure of 10 ksi (FIGS. 6–8), with a liner of 180 ksi yield strength material we need a radius ratio of at least 2.12. Using an autofrettaged jacket, as shown in FIG. 8, made from 120 ksi material, the jacket radius ratio must be at least 2.615. Once again, using an assumed liner radius ratio of 1.1 and the jacket radius ratio of 2.615, the overall radius ratio would be 2.877. The radial stress at the liner jacket interface must equal 80 ksi when the pressure is applied. The stresses at the interface from the loading alone is, from Equation 2, −64.12 ksi from the 80 ksi internal pressure and −1.97 ksi from the 10 ksi external pressure. The interface pressure needed to achieve the manufacturing criteria is then 13.91 ksi (80 ksi—1.97 ksi—64.12 ksi). The interface strain in this case is 0.005466. The temperature difference needed to achieve this is 911° F., using our tolerance of 100° F., and limiting the jacket to 700° F., the liner must be cooled to at least −311° F. which is in the liquid nitrogen range.

One additional concern that we have when dealing with externally pressurized cylinders is the effect of the external pressure when the internal pressure is released. The interface pressure will cause tensile stress at the bore of the jacket, while the external pressure will result in compressive stress at the bore of the jacket. Since the jacket is autofrettaged to produce the maximum compressive stress, any additional net compressive stress will result in yielding and a loss of the required stress conditions. Therefore, the net additional stress from the shrink and the external pressure must be tensile in the jacket at the interface between the liner and the jacket. If this is not the case, then the external pressure must also be released when the internal pressure is released.

For the case cited, the compressive tangential stress applied from external pressure in the jacket from Equation 1 is −22.77 ksi. The tensile stress from the shrink fit is 18.55 ksi from Equation 5. Therefore, the jacket will yield if the external pressure is always applied.

We must also consider the potential yielding of the liner when the internal pressure is released. Again in this case, the residual stress from the shrink fit at the bore of the liner is −159 ksi from Equation 1. The additional stress from the external pressure is −20.8 ksi from Equation 1. Since the combined compressive stress is -179.8 ksi, the liner will not yield. However, since the jacket would yield with the external pressure continuously applied, the external pressure must be reduced when the internal pressure is released. The minimum applied external pressure can be determined using Equation 1 and assuming a yield condition. In the instant case, according to Equation 1, the compressive tangential stress from the external pressure when the internal pressure is released must be no more compressive than the tensile stress produced from the shrink fit or 18.55 ksi. This is achieved when the external pressure is reduced to about 8.9 ksi when the internal pressure is released.

For this case, we must have additional controls on the vessel to control the external pressure as a function of the internal pressure. Also, we must construct an external containment vessel to contain the external pressure around the very high pressure vessel. There may be instances when it is necessary to vary the external pressure as in the case cited. However, there are simple ways around this case. For example, we could use 140 ksi yield strength material for the jacket and autofrettage it such that the residual stresses are somewhat less than the 140 ksi yield strength, and use the geometry as described. This would alleviate the problem of varying in a controlled manner the external pressure. There may be cases however, where it is required to vary the external pressure. An example might be when the liner must be a low strength material that has corrosion resistance.

EXAMPLE 5

Desired Internal Operating Pressure is 100 ksi

In this case we wish to construct a vessel with constant external pressure. A solution is based on FIG. 9, 25 ksi external pressure, as well as Equations 1 and 2. Using FIG. 9, and a 240 ksi yield strength protective liner, we need a vessel with an overall radius ratio of at least 1.633. If we use a single autofrettaged jacket with 140 yield strength material (from FIG. 11) we would need a jacket with a radius ratio of 2.03. However, a jacket radius ratio of 2.03 operating with 100 ksi internal pressure will deflect a great deal when the pressure is applied, making it difficult to maintain the seal of the pressurized fluid. Also, a 2.03 jacket radius ratio made from 140 ksi material supported with 25 ksi external pressure will burst when the internal pressure is 139 ksi. However, common industry practice is to construct vessels that have burst pressures that are about double the operating pressures.

The burst strength $pi_x$ of a thick walled vessel is determined from the following equation:

$$pi_x = 1.15 Sy \ln(Y) + po \quad (9)$$

Where Y is the radius ratio of the layer that contributes to the static strength of the overall vessel. The burst pressure of 139 ksi quoted above is determined from Equation 9 using 140 ksi for the yield strength Sy, 2.03 for the radius ratio Y and 25 ksi for the external pressure po. The common factor of safety for static strength of thick walled vessels is 2, meaning that for an operating pressure of 100 ksi, the vessel should be capable of containing 200 ksi before bursting. If a single jacket of 140 ksi material is used and the external pressure is 25 ksi, the jacket radius ratio from Equation 9 is 2.96. This radius ratio is greater than the minimum required to meet the long life design criterion. However, to produce the required residual stress in the liner, the assembly interference is too great to achieve with shrink fitting a single liner into a single jacket. To ease assembly, the required amount of residual stress in the liner may be produced by first shrinking the protective liner inside a pre-stressed inner layer, and this liner/inner layer assembly is then shrink fitted inside a jacket. Since we are now using a pre-stressed inner layer, we are able to use higher strength material and take its strength into account for static strength considerations.

A solution is to use a liner made from 240 ksi yield strength material with a radius ratio of 1.083 (chosen arbitrarily), a prestressed inner layer with a radius ratio of 1.276 and a jacket with a radius ratio of 2.241. The static strength of the prestressed inner layer is about 50 ksi ((1.15)×180×ln(1.276)) and the static strength of the jacket is 130 ksi (1.15×140×ln(2.241)). The total static strength of the vessel with 25 ksi external support is then 205 ksi which provides an adequate safety factor.

To produce sufficient residual stress, the protective liner and the pre-stressed inner layer are assembled with a 0.0042 interference strain which produces an interference pressure of 6.027 ksi from Equation 5 with Y1 (the radius ratio of the liner) equal to 1.083 and Y (the radius ratio of the assembled protective liner and pre-stressed inner layer) equal to 1.383 (1.083×1.276). This produces a tangential residual stress at the inside radius of the liner of −81.7 ksi using Equation 1 with pi equal to zero, po equal 6.027 ksi, and Y equal to 1.083, and the radius r equal to the inside radius a. This assembly also produces a tensile tangential stress at the inside radius of the prestressed inner layer of +25.146 ksi by using Equation 1 with pi equal to 6.027 ksi, the radius ratio Y equal to 1.276 and the ratio b/r also equal to the radius ratio 1.276. To achieve the interference strain of 0.0042, a temperature difference of about 700° F. is required from Equation 6.

With the second shrink fit operation, a 0.0036 interference strain is used to produce an interference pressure between the prestressed inner layer/protective liner assembly and the jacket of 20.808 ksi. This is calculated from Equation 5 with Y1 (the radius ratio of the protective liner and pre-stressed inner layer assembly) equal to 1.383 and with Y (the radius ratio of the complete protective liner/pre-stressed inner layer/jacket assembly) equal to 3.1 (1.083×1.276×2,241). This produces an additional compressive residual stress at the inside radius of the protective liner equal to −87.213 ksi from using Equation 1 with po equal to 20.808 ksi, Y equal to 1.383 and the ratio a/r equal to 1.0. The shrink also produces a compressive stress at the inside radius of the prestressed inner layer of −80.256 ksi, calculated using Equation 1 with pi equal to zero, po equal to 20.808 ksi, the radius ratio Y equal to 1.387, and the ratio a/r equal to 0.923 (1÷1.083, the inverse of the protective liner radius ratio). A tensile tangential stress is also produced at the inside radius of the jacket from the shrink fit equal to 31.15 ksi, determined from Equation 1 with pi equal to 20.808 ksi, po equal to zero and the ratio b/r and Y both equal to 2.241. The temperature difference required to produce the 0.0036 interference strain is 600° F.

The stresses produced, when the operating pressures are applied, are determined from Equation 1. In the protective liner, the additional compressive stress produced when the external pressure is applied is −55.807 ksi determined from Equation 1 with pi equal to zero, po equal to 25 ksi, Y equal 3.1, and the ratio a/r equal to 1.0. Therefore, the total compressive tangential stress is the sum of the stress from the two shrink fits plus the external pressure or −224.8 ksi (−81.775−87.213−55.807=−224.8). Since this is less than the yield strength of the material, the external pressure can remain applied even when the internal pressure is zero. When the internal pressure of 100 ksi is applied, the tangential tensile stress produced at the inside radius of the liner is 123.23 ksi calculated from Equation 1 with po equal to zero, pi equal to 100 ksi, Y and the ratio b/r both equal to 3.1. The total tangential stress at the inside radius of the liner when fully assembled and with both the external and internal pressures applied is −101.57 ksi (−224.8+123.23=101.57). Since this stress is more compressive than the fluid pressure of 100 ksi, any crack produced will not open and therefore our design criterion is met.

In the prestressed inner layer, the stress produced from the applied external pressure is −51.679 ksi determined from Equation 1 with pi equal to zero, po equal to 25 ksi, Y equal to 3.1 and the ratio a/r equal to 0.923 (1÷1.0833, the inverse of the protective liner radius ratio). The total tangential stress applied at the inside radius of the prestressed inner layer after assembly, and with the external pressure applied is −106.78 ksi. Since this is less than the yield strength of the material used in this layer, the external pressure can remain applied at all times without fear of the layer yielding. When the internal pressure is applied, the additional tangential stress produce is 106.7 ksi determined from Equation 1 with po equal to zero, pi equal to 100 ksi, Y equal to 3.1 and the ratio b/r equal to the combined radius ratio of the prestressed inner layer and the jacket or 2.860 (1.276×2.241). The total tangential stress is essentially zero at the inner radius of the prestressed inner layer when the vessel is assembled and the internal and external pressures are applied, therefore, this location also meets the design criterion.

Finally, in the jacket, the tangential stress applied at the inside radius of the jacket when the external pressure is applied is −42.48 ksi determined from Equation 1 with po equal to 25 ksi, pi equal to zero, Y equal to 3.1, and the ratio a/r equal to 0.7229 (the inverse of the combined radius ratio of the protective liner and the prestressed inner layer). The tangential stress at the inside radius of the jacket due to the internal pressure is 69.9 ksi determined from Equation 1 with po equal to zero, pi equal to 100 ksi, Y equal to 3.1 and the ratio b/r equal to the radius ratio of the jacket or 2.241. The total tangential stress applied at the inside radius of the jacket when assembled and with the internal and external pressures applied is 58.6 ksi. To meet the design criterion, the total stress must be equal zero when assembled and loaded, therefore, the jacket must be autofrettaged to produce at least -58.6 ksi residual stress for the design criterion to be met. With this much residual stress when the vessel is assembled and the external pressure only is applied, the total tangential stress at the inside radius of the jacket is −70 ksi which is less compressive than −98 ksi (70% of the yield strength of the jacket material) which is the maximum compressive stress that can be applied before yielding in an autofrettaged jacket. Therefore, the design criterion is met.

The condition that underlies everything is the manufacturing criterion that any fatigue cracks initiated will be prevented from opening at maximum load, thus producing no crack propagation.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

I claim:

1. A method of manufacturing a pressure vessel that undergoes high cycle loading at very high pressures, the method comprising the steps of:

providing one of a monobloc pressure vessel and a multilayered pressure vessel, said pressure vessel having an inside bore radius; and creating a residual tangential stress across the provided vessel such that at the bore radius of the provided vessel, the tangential stress is more compressive than a maximum applied internal pressure.

2. The method of claim 1, further comprising the step of maintaining the tangential stress less than zero at radial distances other than the bore radius.

3. The method of claim 1, wherein the provided vessel is a monobloc structure and the step of creating a residual tangential stress includes autofrettaging the vessel.

4. The method of claim 3, wherein the maximum applied internal pressure is less than 60 ksi.

5. The method of claim 1, wherein the vessel includes at least one liner and a jacket and the step of creating a residual tangential stress includes shrink fitting the at least one liner inside the jacket.

6. The method of claim 5, wherein when an external pressure is zero, the residual tangential stress to be created at an inner radius of the jacket is determined by the equation:

$$\sigma_t = \frac{pi}{Y1^2-1}(1+Y1^2) - Sy = 0$$

wherein $\sigma_t$ is the residual tangential stress, pi is the internal pressure, Y1 is the radius ratio of the exterior radius of the jacket to the internal radius of the jacket, and Sy is the yield strength of the material used.

7. The method of claim 5, wherein when an external pressure is zero, the residual tangential stress to be created at the pressure boundary is determined by the equation:

$$\sigma_t = \frac{pi}{Y^2-1}(1+Y^2) - Sy = -pi$$

wherein $\sigma_t$ is the residual tangential stress, pi is the internal pressure, Y is the radius ratio of the exterior radius of the vessel to the internal radius of the vessel, and Sy is the yield strength of the material used.

8. The method of claim 5, further comprising the step of creating an interference strain between an outermost liner and $$\varepsilon = \frac{po}{E}\left[\frac{2Y1^2(Y^2-1)}{(Y^2-Y1^2(Y1^2-1)}\right]$$

the jacket, wherein the interference strain is determined by:

where $\epsilon$ is the interference strain, po is the external pressure,

Y1 is the radius ratio of the exterior radius of the liner to the internal radius of the liner, Y is the overall radius ration of the exterior radius of the vessel to the internal radius of the vessel, and E is the elastic modulus of the material used.

9. The method of claim 5, wherein the step of creating a residual tangential stress includes the step of:

autofrettaging the jacket.

10. A method of creating a pressure vessel having an internal bore radius such that the pressure vessel can survive very high pressure loading and high cycle loading, the method comprising the steps of creating residual tangential stresses in the vessel; and maintaining the tangential stress of the vessel at the bore radius of the vessel more compressive than a maximum applied internal pressure.

11. The method of claim 10, further comprising the step of maintaining the tangential stress less than zero at radial distances other than the bore radius.

12. The method of claim 10, wherein the chosen vessel is a monobloc structure and the step of creating a residual tangential stress includes autofrettaging the vessel.

13. The method of claim 12, where in the maximum applied internal pressure is less than 60 ksi.

14. The method of claim 10, wherein the vessel includes at least one liner and a jacket and the step of creating a residual tangential stress includes shrink fitting the at least one liner inside the jacket.

15. The method of claim 14, wherein when an external pressure is zero, the residual tangential stress to be created at an inner $$\sigma_t = \frac{pi}{Y1^2 - 1}(1 + Y1^2) - Sy = 0$$

radius of the jacket is determined by the equation:

wherein $\sigma_t$ is the residual tangential stress, pi is the internal pressure, Y1 is the radius ratio of the exterior radius of the jacket to the internal radius of the jacket, and Sy is the yield strength of the material used.

16. The method of claim 14, wherein when an external pressure is zero, the residual tangential stress to be created at the pressure boundary is determined by the equation:

$$\sigma_t = \frac{pi}{Y^2 - 1}(1 + Y^2) - Sy = -pi$$

wherein $\sigma_t$ is the residual tangential stress, pi is the internal pressure, Y is the radius ratio of the exterior radius of the vessel to the internal radius of the vessel, and Sy is the yield strength of the material used.

17. The method of claim 14, further comprising the step of creating an interference strain between an outermost liner and the jacket, wherein the interference strain is determined by:

$$\varepsilon = \frac{po}{E}\left[\frac{2Y1^2(Y^2 - 1)}{(Y^2 - Y1^2(Y1^2 - 1)}\right]$$

where $\epsilon$ is the interference strain, po is the external pressure,

Y1 is the radius ratio of the exterior radius of the liner to the internal radius of the liner, Y is the overall radius ration of the exterior radius of the vessel to the internal radius of the vessel, and E is the elastic modulus of the material used.

18. The method of claim 14, wherein the step of creating a residual tangential stress includes the step of:

autofrettaging the jacket.

* * * * *